United States Patent [19]

Lin

[11] Patent Number: 5,199,776
[45] Date of Patent: Apr. 6, 1993

[54] SURFACE PANEL WITH DISK DRIVER HOLDER OPENING AND CORRESPONDING COVER PLATE

[76] Inventor: Chung H. Lin, 5F-23, 70, Fu-Shing Road, Taoyuan, Taiwan

[21] Appl. No.: 815,148

[22] Filed: Dec. 31, 1991

[51] Int. Cl.⁵ .............................................. A47B 96/20
[52] U.S. Cl. .................................. 312/293.3; 312/242
[58] Field of Search ....................... 312/242, 245, 293.3

[56] References Cited

U.S. PATENT DOCUMENTS 4,645,876  2/1987  Albertson ...................... 312/245 X
4,867,512  9/1989  Wilkins et al. ........................ 312/245

Primary Examiner—Peter R. Brown
Attorney, Agent, or Firm—Bacon & Thomas

[57] ABSTRACT

A surface panel with a disk driver holder opening and corresponding cover plate, whereby the cover plate may be easily fitted to the holder opening of the surface panel by engagement of upper and lower hook elements and positioning elements at two lateral sides of the cover plate to corresponding upper and lower positioning elements and hook elements at two lateral sides of the holder opening, with the holder opening being sized for fitting of a disk driver so that the latter remains flush with the holder opening without forming a gap between the disk driver and holder opening after installation.

1 Claim, 3 Drawing Sheets

SURFACE PANEL WITH DISK DRIVER HOLDER OPENING AND CORRESPONDING COVER PLATE

BACKGROUND OF THE INVENTION (1) Field of the Invention

The present invention relates to the structure of a disk driver holder opening and cover plate at the surface panel of a computer, and particularly a design of joining system for the disk driver holder opening and cover plate, and a structure to permit firmly fitting the disk driver.

(2) Description of the Prior Art

Generally there are two or three disk driver holder openings on each computer surface panel, and all unused disk driver holder openings on it are usually covered by cover plates so that the nice appearance of the surface panel is not damaged. Therefore, the cover plate must be easy to remove or install, and it must have a size corresponding to the size of disk driver holder opening so that the nice appearance of the surface panel is not affected. Conventionally, there are three kinds of configurations for a disk driver holder opening and cover plate at the surface panel, as follows:

(1) Lock-in Type Cover Plate: There is a hole at each lateral lug (11) on each cover plate (1), as shown in FIG. 1, and there are corresponding screw holes (21) at posts on edges of each disk driver holder opening at each surface panel (2) so that the cover plate (1) can be locked to the surface panel (2) by bolts (12). In this design, though no extra gap will exist after installation of the disk driver, removal of the cover plate (1) is labor and time consuming for it is necessary to remove the surface panel first before the bolts (12) can be loosened for removal of the cover plate (1).

(2) Reverse Hooking Type Cover Plate: As shown in FIG. 2, the prevailing configuration at the present time, there is a hook (13) extending outwards from each lateral side of a cover plate (1) for seizure by a frame (22) of a disk driver holder opening at a surface panel (2) so as the cover plate (1) is prevented from outward displacement by the hooks (13), and a stepped portion (23) is formed between the edge of the cover plate (1) and the frame (22) to prevent from inward displacement of the cover plate (1). With such a design, an outward projection of the frame (22) is left after installation of the disk driver, and consequently a relatively large gap (15) exists at the stepped portion (23) damages the appearance of the surface panel (2), and requires highly precise and complicated tooling. Hence, production cost of such surface, panel is high, and the output of defective products is also high.

(3) Lock-in Disk Driver Frame: As shown in FIG. 3, a long lug (16) is extended from the back of each lateral side of a cover plate (1) and a disk driver frame (3) with corresponding holes so as the cover plate (1) is fixed to a surface panel (2) by bolts (17) from inner side of the disk drive frame (3) to the lugs (16). With such a design, though gap between disk driver and the disk driver frame (3) can be minimized, the long lugs (16) can break easily, packing of which is difficult, it is not easy to keep the cover plate (1) flush with the surface panel (2) after installation, and it is inconvenient to install or remove the cover plate (1) since tightening or loosening of bolts (17) is required.

SUMMARY OF THE INVENTION

In consideration of the above defects, the present invention provides a surface panel with a disk driver holder opening and corresponding cover plate configuration which has the following features:

(1) The disk driver holder opening and its corresponding cover plate are fitted by a joint system so that the cover plate can be firmly fitted to the surface panel, it is easy to remove the cover plate, and the disk driver, after installation, can be flush with the surface panel.

(2) The cover plate can be firmly fitted to the disk driver holder opening by engagement of the upper hook element, lower hook elements and positioning element at each lateral side of the cover plate to the upper positioning element, lower positioning element and the hook element at the disk driver holder opening. Installation and removal of the cover plate is easy.

(3) The disk driver holder opening has is sized just for fitting a disk driver so that the disk driver is flush with the disk driver holder opening without a gap between the disk driver and the disk driver holder opening after installation.

(4) The hook elements at both lateral sides of the disk driver holder opening are elastic so that they can be displaced outwards to prevent their interference during installation of the disk driver.

The main object of the present invention is to provide a surface panel with a disk driver holder opening and corresponding cover plate which is designed so that the cover plate can be easily fitted to the disk driver holder opening at the surface panel by engagement of the upper hook element, lower hook elements and positioning element at each lateral side of the cover plate to the upper positioning element, lower positioning element and the hook element at the disk driver holder opening, and the disk driver holder opening is sized just for fitting a disk driver so that the disk driver is flush with the disk driver holder opening without forming a gap between the disk driver and the disk driver holder opening after installation.

DETAILED DESCRIPTION OF THE PREFERRED EMBODIMENT

Figure 1:
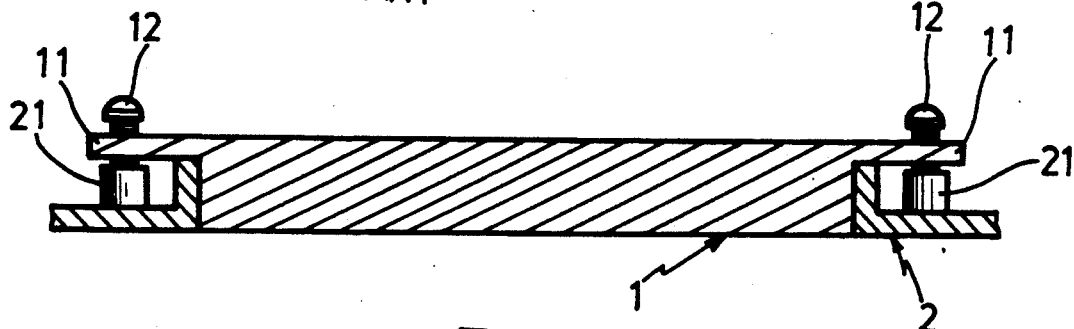
FIG. 1 illustrates first kind of conventional surface panel with disk driver holder opening and corresponding cover plate.
Figure 2:
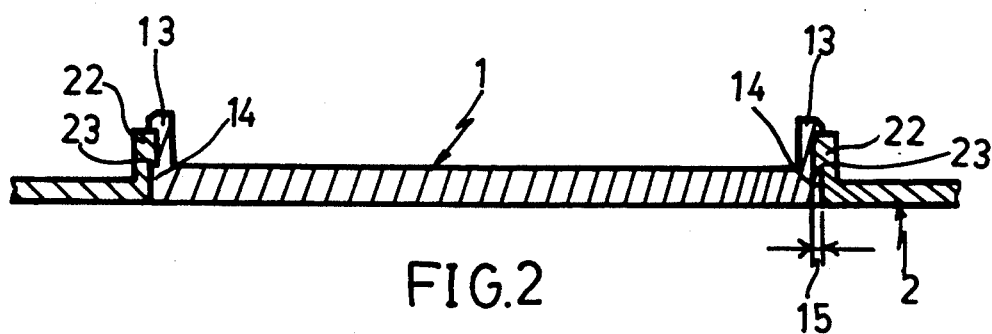
FIG. 2 illustrates second kind of conventional surface panel with disk driver holder opening and corresponding cover plate.
Figure 3:
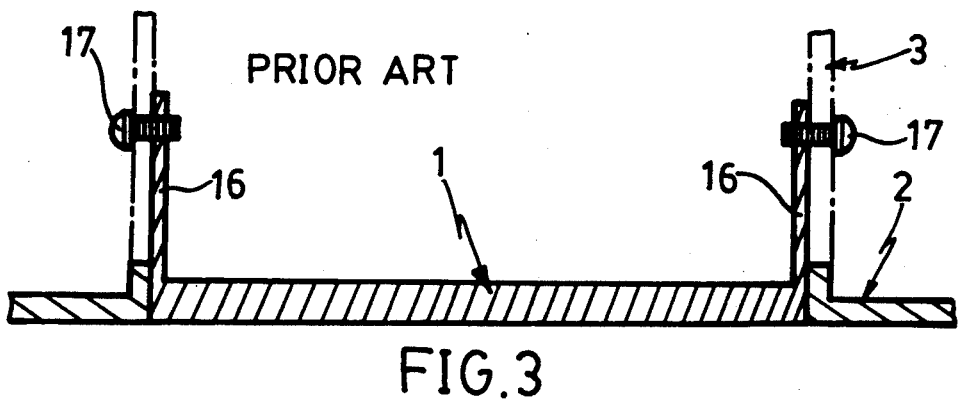
FIG. 3 illustrates third kind of conventional surface panel with disk driver holder opening and corresponding cover plate.
Figure 4:
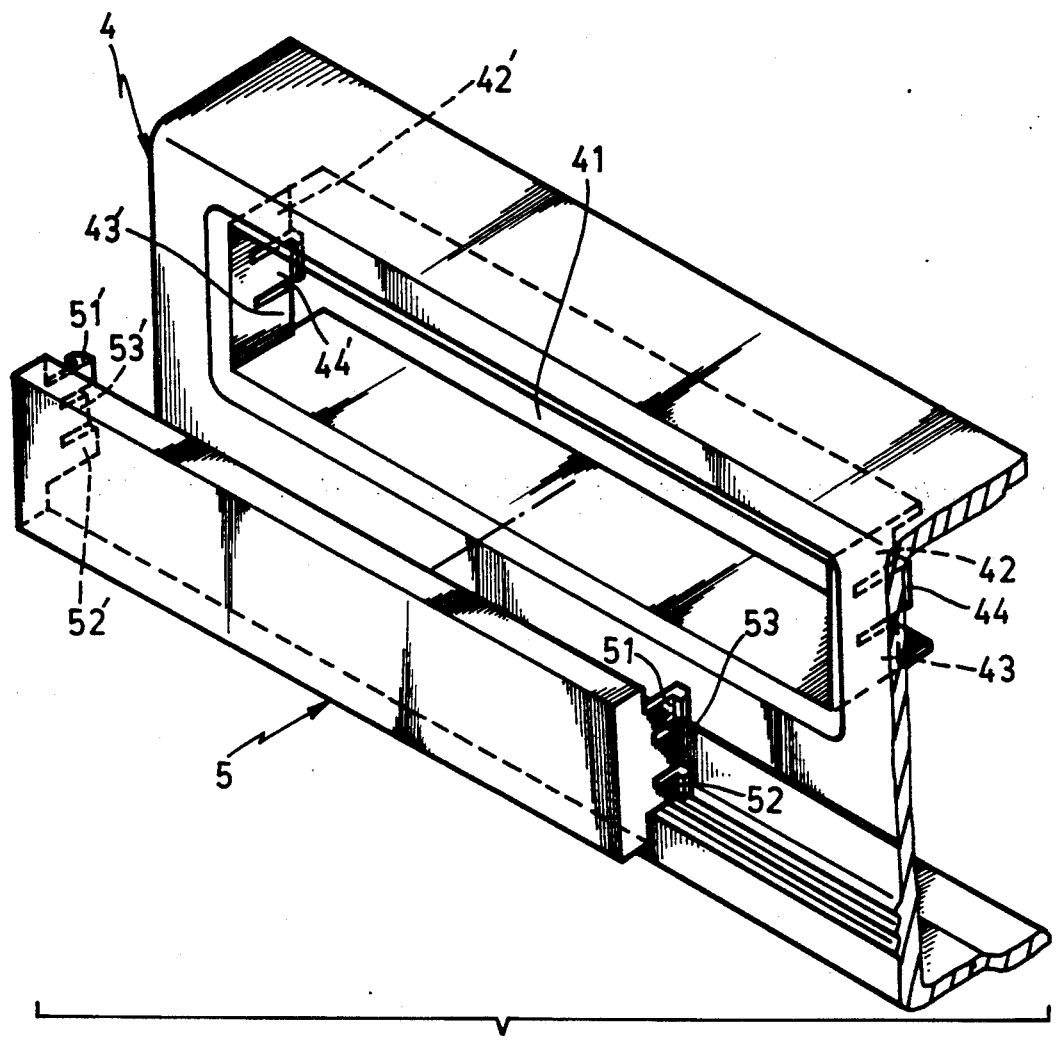
FIG. 4 is a fragmented view of a surface panel with a disk driver holder opening and corresponding cover plate according to the present invention.
Figure 5:
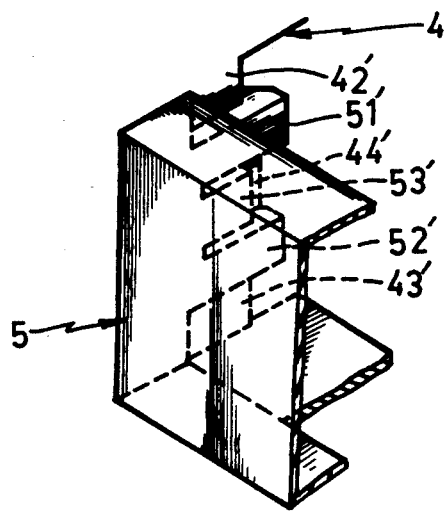
FIG. 5 illustrates a assembly of the surface panel with disk driver holder opening and corresponding cover plate according to the present invention.
Figure 6:
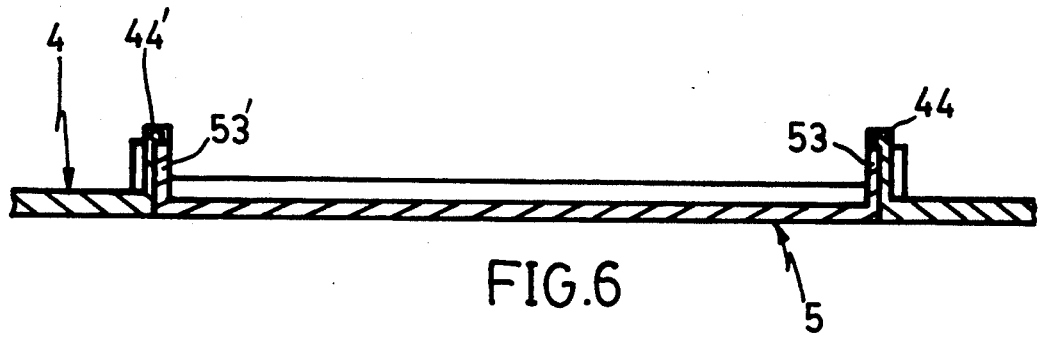
FIG. 6 illustrates engagement of the cover plate to the surface panel with hook elements according to the present invention.
Figure 7:
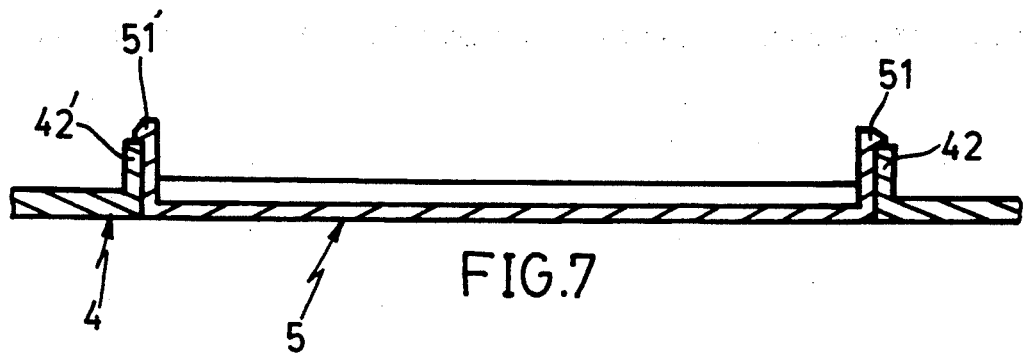
FIG. 7 illustrates engagement of the cover plate to the surface panel with upper and lower hook elements of the cover plate according to the present invention.

As shown in FIG. 4, a surface panel (4) according to the present invention has a disk driver opening (41) with a symmetric upper positioning element (42 or 42') and a lower positioning elements (43 or 43') on each of two inner lateral edges. There is a hook element (44 or 44') projecting inwards between the upper positioning element (42 or 42') and the lower positioning element (43 or 43'). The present invention also includes a cover plate (5) with an upper hook element (51 or 51') and a lower hook element (52 or 52') extending backwards from each of two lateral sides. There is a positioning element (53 or 53') between the upper hook element (51 or 51') and the lower hook element (52 or 52'). The positioning element (53 or 53') is shorter than both the upper hook element (51 or 51') and the lower hook element (52 or 52').

As shown in FIGS. 4, 5, 6 and 7, when the cover plate (5) is fitted to the disk driver holder opening (41) at the surface panel (4), it is retained at the surface panel (4) by the upper and lower hook elements (51, 51', 52 and 52') which respectively engage the upper and lower positioning elements (42, 42', 43, 43') so that the cover plate (5) is retained by an outward pulling force, while the positioning elements (53 and 53') of the cover plate (5) are engaged by the hook elements (44 and 44') at the disk driver holder opening (41) so as the cover plate (5) is retained by an inward pulling force, and consequently the cover plate (5) is firmly fixed on the disk driver holder opening (41). It is a fitting form simply by hooking, it is easy to install and remove, and these components can be formed by simple tooling.

Figure 8:
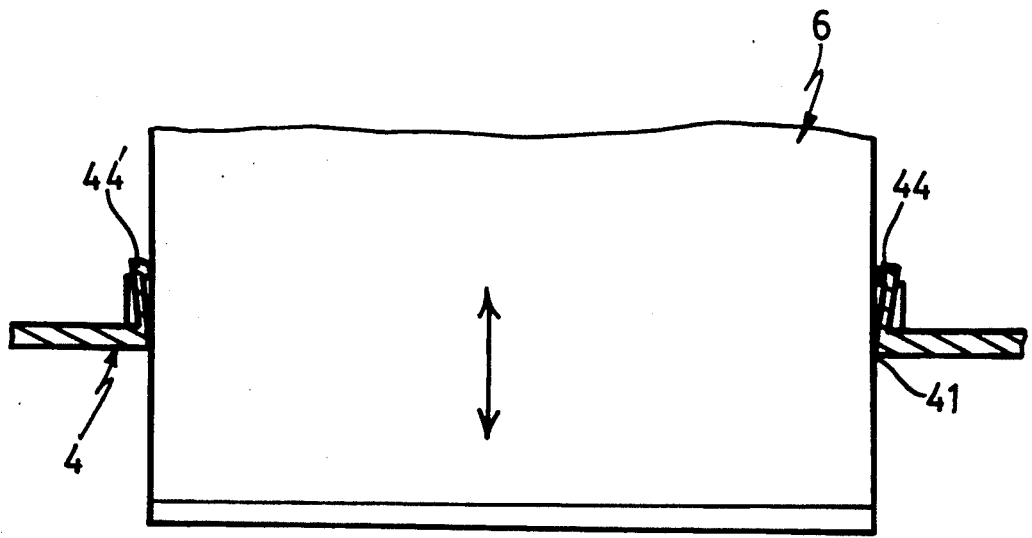
FIG. 8 illustrates an assembly of a disk driver to the surface panel with disk driver holder opening and corresponding cover plate according to the present invention.

As shown in FIG. 8, after removal of the cover plate (5) from the surface panel (4), a disk driver (6) can be installed from either the back or front of the surface panel (4). The hook elements (44 and 44') at both lateral sides of the disk driver holder opening (41) are elastic so that they can displace outwardly to avoid interference during installation of the disk driver (6). The disk driver holder opening (41) is sized just to fit the disk driver (6) so that the disk driver (6) can be fitted and kept flush with the surface panel (4) with only minimum gaps between the edge of the disk driver (6) and the disk driver holder opening (41). Therefore, the present invention provides a surface panel (4) with a disk driver holder opening (41) sized just for fitting of a disk driver (6) so that the disk driver (6) can be kept flush with the surface panel with a minimum gap, and a corresponding cover plate (5) which can be fitted and removed easily.

What is claimed is:

1. A surface panel with a disk driver holder opening and a corresponding cover plate comprising:
   a) a surface panel having a disk drive holder opening formed therein, the opening including two inner lateral edges, each inner lateral edge being provided with an upper positioning element, a lower positioning element and an inwardly extending hook element positioned between the upper and lower positioning elements;
   b) a removable cover plate including two inner lateral edges, each inner lateral edge being provided with an upper outwardly extending hook element, a lower outwardly extending hook element and a positioning element disposed between the upper and lower outwardly extending hook elements;
   c) whereby the cover plate may be fitted within the disk driver holder opening and secured in place through engagement of the upper outwardly extending hook elements, lower outwardly extending hook elements and positioning elements of the cover plate with, respectively, the upper positioning elements, lower positioning elements and inwardly extending hook elements of the holder opening; and
   d) the disk driver holder opening being sized for fitting a disk driver therein and disposing the disk driver flush with the holder opening after installation.

* * * * *